United States Patent
Kim et al.

(10) Patent No.: US 12,230,038 B2
(45) Date of Patent: Feb. 18, 2025

(54) APPARATUS AND METHOD FOR PREDICTING TRAJECTORY OF SURROUNDING VEHICLE

(71) Applicants: HYUNDAI MOTOR COMPANY, Seoul (KR); Kia Corporation, Seoul (KR); IUCF-HYU (Industry-University Cooperation Foundation Hanyang University), Seoul (KR)

(72) Inventors: Jun Soo Kim, Seoul (KR); Jeong Soo Kim, Seoul (KR); Wan Jae Lee, Suwon-si (KR); Jun Won Choi, Seoul (KR); Byeoung Do Kim, Seoul (KR); Seok Hwan Lee, Seoul (KR)

(73) Assignees: HYUNDAI MOTOR COMPANY, Seoul (KR); KIA CORPORATION, Seoul (KR); IUCF-HYU (Industry-University Cooperation, Foundation, Hanyang University), Seoul (KR)

( * ) Notice: Subject to any disclaimer, the term of this patent is extended or adjusted under 35 U.S.C. 154(b) by 628 days.

(21) Appl. No.: 17/475,760

(22) Filed: Sep. 15, 2021

(65) Prior Publication Data
US 2022/0327317 A1    Oct. 13, 2022

(30) Foreign Application Priority Data
Apr. 8, 2021   (KR) .................. 10-2021-0046141

(51) Int. Cl.
  *G06V 20/56*   (2022.01)
  *G06N 3/044*   (2023.01)
  *G06N 3/045*   (2023.01)

(52) U.S. Cl.
  CPC .......... *G06V 20/588* (2022.01); *G06N 3/044* (2023.01); *G06N 3/045* (2023.01)

(58) Field of Classification Search
  CPC ...... G06V 20/588; G06V 10/82; G06N 3/044; G06N 3/045; G06N 3/0442; G06N 3/0464;
  (Continued)

(56) References Cited

U.S. PATENT DOCUMENTS

2022/0076032 A1*   3/2022   Jain .................. G06V 10/955
2023/0159035 A1*   5/2023   Tanaka ................ B60W 40/04
                                                701/70

FOREIGN PATENT DOCUMENTS

KR   10-2133342 B1       7/2020
KR   102176483 B1 *   11/2020

OTHER PUBLICATIONS

Kim et al. ,Probabilistic Vehicle Trajectory Prediction over Occupancy Grid Map via Recurrent Neural Network, 2017 IEEE 20th International Conference on Intelligent Transportation Systems (ITSC): Workshop) (Year: 2017).*
(Continued)

*Primary Examiner* — Said M Elnoubi
(74) *Attorney, Agent, or Firm* — MORGAN, LEWIS & BOCKIUS LLP

(57) ABSTRACT

An apparatus for predicting a trajectory of a surrounding vehicle includes a storage configured to store a high definition map, a lane Selection Network (LSN), and a Trajectory Prediction Network (TPN) and a controller that extracts lane information around a target vehicle, traveling around a host vehicle, based on the high definition map, inputs the lane information around the target vehicle and previous trajectory information of the target vehicle to the LSN to detect reference lane information, and inputs the reference lane information and the previous trajectory information of
(Continued)

the target vehicle to the TPN to acquire future trajectory information of the target vehicle.

12 Claims, 9 Drawing Sheets

(58) Field of Classification Search
CPC ... G06N 3/08; B60W 60/0027; B60W 50/0097; B60W 40/06; B60W 50/14; B60W 60/0015; B60W 2050/146; B60W 2556/40; G05D 1/0055; G05D 2201/0213
See application file for complete search history.

(56) References Cited

OTHER PUBLICATIONS

Tianyang Zhao, et al. "Multi-Agent Tensor Fusion for Contextual Trajectory Prediction," Proceedings of the IEEE Conference on Computer Vision and Pattern Recognition, 2019.
Nicholas Rhinehart, et al., "R2P2: A Reparameterized Pushforward Policy for Diverse, Precise Generative Path Forecasting," Proceedings of the European Conference on Computer Vision (ECCV), 2018.
Henggang Cui, et al. "Multimodal Trajectory Predictions for Autonomous Driving Using Deep Convolutional Networks," 2019 International Conference on Robotics and Automation (ICRA), IEEE, 2019.

* cited by examiner

APPARATUS AND METHOD FOR PREDICTING TRAJECTORY OF SURROUNDING VEHICLE

CROSS-REFERENCE TO RELATED APPLICATION

This application claims the benefit of priority to Korean Patent Application No. 10-2021-0046141, filed in the Korean Intellectual Property Office on Apr. 8, 2021, the entire contents of which are incorporated herein by reference.

TECHNICAL FIELD

The present disclosure relates to predicting a future trajectory of a target vehicle among surrounding vehicles in an autonomous vehicle.

BACKGROUND

In general, an autonomous vehicle may recognize road environments for itself to determine driving situations and may move to a target location along a planned driving trajectory from its current location. Such an autonomous vehicle needs accurate information about future trajectories of surrounding vehicles to maintain driving stability.

A technology of predicting future trajectories of surrounding vehicles is an important technology capable of allowing an autonomous vehicle to determine a critical situation when the autonomous vehicle is traveling and plan a safe trajectory to stably travel. However, because an autonomous vehicle is affected in a real driving environment by various variables such as driving environments or vehicles around the autonomous vehicle, it is difficult to accurately predict a future trajectory by simply using only a past trajectory. Thus, there is a need for a trajectory prediction technique of more accurately predicting a trajectory with regard to elements which have an influence on driving of the vehicle for safe autonomous driving.

Road information is the most basic index the vehicle considers while driving. The vehicle generally travels along a lane connected to a destination. Thus, the road information is an important element limiting a driving path of the vehicle, and lane information where the vehicle is traveling acts as an important index for identifying directionality where the vehicle is traveling. As a result, the vehicle trajectory prediction technique needs to first consider surrounding road information among various driving environment elements of a vehicle to be predicted, and the suitable use of road information plays an important role in enhancing accuracy of trajectory prediction.

Because an existing technology of predicting a future trajectory of a surrounding vehicle predicts the future trajectory of the surrounding vehicle based on a high definition map, past trajectory information (coordinate data) of the surrounding vehicle, and surrounding environment information in the form of an image, it is difficult to fuse the surrounding environment information in the form of an image and the past trajectory information in the form of coordinate data. Particularly, because object information among surrounding environment information in the form of an image is mainly reflected, accuracy of predicting a future trajectory of the surrounding vehicle is degraded.

Details described in the background art are written to increase the understanding of the background of the present disclosure, which may include details rather than an existing technology well known to those skilled in the art.

SUMMARY

The present disclosure has been made to solve the above-mentioned problems occurring in the prior art while advantages achieved by the prior art are maintained intact.

An aspect of the present disclosure provides an apparatus and a method for predicting a trajectory of a surrounding vehicle to input past trajectory information of the target vehicle and lane information around the target vehicle to a lane selection network (LSN), the learning of which is completed, to detect reference lane information and input the detected reference lane information and the past trajectory information of the target vehicle to a trajectory prediction network (TPN), the learning of which is completed, to output future trajectory information of the target vehicle to predict a future trajectory of the target vehicle at high accuracy.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an apparatus for predicting a trajectory of a surrounding vehicle may include: a storage storing a high definition map, a Lane Selection Network (LSN), and a Trajectory Prediction Network (TPN) and a controller that extracts lane information around a target vehicle, traveling around a host vehicle, based on the high definition map, inputs the lane information around the target vehicle and previous trajectory information of the target vehicle to the LSN to detect reference lane information, and inputs the reference lane information and the previous trajectory information of the target vehicle to the TPN to acquire future trajectory information of the target vehicle.

The controller may display the predicted future trajectory information of the target vehicle on a map.

The lane information may be a lane coordinate vector (LCV) indicating a center line of each lane.

The controller may determine center lines for respective lanes based on a reference center line located closest to a previous driving trajectory of the target vehicle, may project a current location of the target vehicle onto each center line, may set segments with respect to the current location of the target vehicle on each center line, and may extract coordinates of equal intervals on each segment as the lane information.

The previous trajectory information and the future trajectory information of the target vehicle may be a trajectory coordinate vector (TCV).

The controller may input the previous trajectory information of the target vehicle to a first convolution neural network (CNN) to extract a first feature value, may input the lane information around the target vehicle to a second CNN to extract a second feature value, may concatenate the first feature value with the second feature value to input the concatenated value to a fully connected network (FCN), may apply a 'softmax function' to an output of the FCN to calculate a probability value for each lane, and may output lane information having the highest probability value as the reference lane information.

The controller may input the previous trajectory information of the target vehicle to a third CNN, may input the output of the third CNN to a first long short-term memory (LSTM) network to extract a feature value for the previous trajectory information of the target vehicle, may input the reference lane information of the target vehicle to a fourth CNN, may input the output of the fourth CNN to a second LSTM network to extract a feature value for the reference lane information of the target vehicle, may concatenate the feature value for the previous trajectory information of the target vehicle with the feature value for the reference lane information to input the concatenated value to an FCN, and may output an output of the FCN as the future trajectory information of the target vehicle.

The controller may obtain a high definition map around the target vehicle from a server and may store the obtained high definition map in the storage.

According to another aspect of the present disclosure, a method for predicting a trajectory of a surrounding vehicle may include storing, by a storage, a high definition map, a Lane Selection Network (LSN), and a Trajectory Prediction Network (TPN), extracting, by a controller, lane information around a target vehicle based on the high definition map, inputting, by the controller, the lane information around the target vehicle and previous trajectory information of the target vehicle to the LSN to detect reference lane information, and inputting, by the controller, the reference lane information and the previous trajectory information of the target vehicle to the TPN to acquire future trajectory information of the target vehicle.

The method may further include displaying, by the controller, the predicted future trajectory information of the target vehicle on a map.

The extracting of the lane information around the target vehicle may include determining center lines for respective lanes based on a reference center line located closest to a previous driving trajectory of the target vehicle, projecting a current location of the target vehicle onto each center line, setting segments with respect to the current location of the target vehicle on each center line, and extracting coordinates of equal intervals on each segment as the lane information.

The detecting of the reference lane information may include inputting the previous trajectory information of the target vehicle to a first CNN to extract a first feature value, inputting the lane information around the target vehicle to a second CNN to extract a second feature value, concatenating the first feature value with the second feature value to input the concatenated value to an FCN, applying a 'softmax function' to an output of the FCN to calculate a probability value for each lane, and outputting lane information having the highest probability value as the reference lane information.

The predicting of the future trajectory information of the target vehicle may include inputting the previous trajectory information of the target vehicle to a third CNN, inputting an output of the third CNN to a first LSTM network to extract a feature value for the previous trajectory information of the target vehicle, inputting the reference lane information of the target vehicle to a fourth CNN, inputting an output of the fourth CNN to a second LSTM network to extract a feature value for the reference lane information of the target vehicle, concatenating the feature value for the previous trajectory information of the target vehicle with the feature value for the reference lane information to input the concatenated value to an FCN, and outputting an output of the FCN as the future trajectory information of the target vehicle.

The storing may include obtaining, by the controller, a high definition map around the target vehicle from a server.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
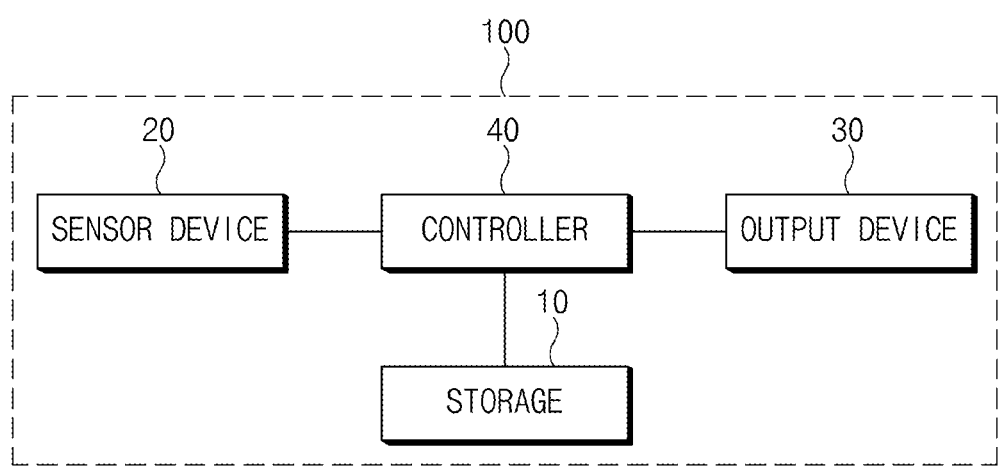
FIG. 1 is a block diagram illustrating a configuration of an apparatus for predicting a trajectory of a surrounding vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In an embodiment of the present embodiment, the lane refers to a lane where a vehicle travels, the road is composed of a plurality of lanes (e.g., a first lane, a second lane, and the like), and the center line of the lane refers to a virtual line passing through the center of the lane. In this case, the virtual line may be represented as, for example, a lane coordinate vector (LCV).

FIG. 1 is a block diagram illustrating a configuration of an apparatus for predicting a trajectory of a surrounding vehicle according to an embodiment of the present disclosure.

As shown in FIG. 1, an apparatus 100 for predicting a trajectory of a surrounding vehicle according to an embodiment of the present disclosure may include a storage 10, a sensor device 20, an output device 30, and a controller 40. In this case, the respective components may be combined into one component and some components may be omitted, depending on a manner which executes the apparatus for predicting the trajectory of the surrounding vehicle according to an embodiment of the present disclosure.

Seeing the respective components, first of all, the storage 10 may store various logics, algorithms, and programs required in a process of inputting previous trajectory information of a target vehicle traveling around a host vehicle (an autonomous vehicle) and lane information around the target vehicle to a lane selection network (LSN), the learning of which is completed, to detect reference lane information and inputting the detected reference lane information and the previous trajectory information of the target vehicle to a trajectory prediction network (TPN), the learning of which is completed, to output future trajectory information of the target vehicle. Herein, each of the LSN and the TPN may be a deep learning model, the learning of which is completed, which may be stored in the storage 10.

The storage 10 may store a trajectory coordinate vector (TCV) as previous trajectory information and future trajectory information of the target vehicle, which are detected by the controller 40, and a lane coordinate vector (LCV) indicating a center line of each lane, which is lane information around the target vehicle.

The storage 10 may store a high definition map. In this case, the high definition map may be a map for autonomous driving and may include lane information, traffic light information, signpost information, or the like of the road to measure an accurate location of the vehicle and strengthen safety of autonomous driving.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

Figure 2:
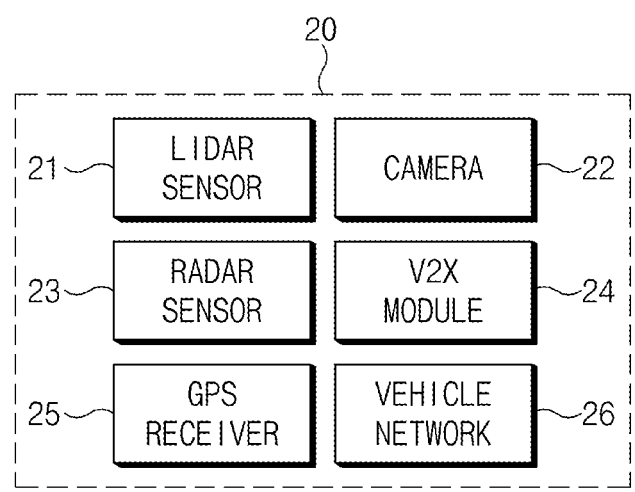
FIG. 2 is a block diagram illustrating a detailed configuration of a sensor device provided in an apparatus for predicting a trajectory of a surrounding vehicle according to an embodiment of the present disclosure.

As shown in FIG. 2, the sensor device 20 may be collectively referred to as various sensors mounted on the autonomous vehicle.

FIG. 2 is a block diagram illustrating a detailed configuration of a sensor device provided in an apparatus for predicting a trajectory of a surrounding vehicle according to an embodiment of the present disclosure.

As shown in FIG. 2, a sensor device 20 provided in the apparatus 100 for predicting the trajectory of the surrounding vehicle according to an embodiment of the present disclosure may include a light detection and ranging (Li-DAR) sensor 21, a camera 22, a radio detecting and ranging (RaDAR) sensor 23, a vehicle-to-everything (V2X) module 24, a global positioning system (GPS) receiver 25, and a vehicle network 26.

The LiDAR sensor 21 may be a type of environment sensor. When the LiDAR sensor 21 is loaded into the autonomous vehicle to rotate and emit a laser pulse in all directions, it may measure location coordinates or the like of a reflector based on a time when the laser pulse is reflected and returned.

The camera 22 may be mounted on the rear of an indoor rear-view mirror of the autonomous vehicle to capture an image including a lane, a vehicle, a person, or the like located around the autonomous vehicle.

The RaDAR sensor 23 may be a module which emits an electromagnetic wave and receives the electromagnetic wave reflected from an object to measure a distance from the object, a direction of the object, or the like. The RaDAR sensor 23 may be mounted on a front bumper and a rear side of the autonomous vehicle, which may perform long-range object recognition and may hardly be affected by weather.

The V2X module 24 may include a vehicle-to-vehicle (V2V) module (not shown) and a vehicle-to-infrastructure (V2I) module (not shown). The V2V module may communicate with a surrounding vehicle to obtain a location, a speed, acceleration, a yaw rate, a heading direction, or the like of another surrounding vehicle. The V2I module may obtain a shape of the road, a surrounding structure, or traffic light information (e.g., a location or a lighting state (red, yellow, green, or the like)) from an infrastructure.

The GPS receiver 25 may receive GPS signals from three or more GPS receivers.

The vehicle network 26 may be a network for communication between respective controllers in the autonomous vehicle, which may include a controller area network (CAN), a local interconnect network (LIN), FlexRay, media oriented systems transport (MOST), an Ethernet, or the like.

An output device 30 of FIG. 1 may generate an output associated with being visual, audible, tactile, or the like, which may include a display, a sound output module, or the like.

The display may display (output) information processed by a multimedia system for vehicle. For example, when the vehicle is in a navigation mode, the display may display a map associated with a current location, a destination, a trajectory, or the like in conjunction with driving of the vehicle or may display a user interface (UI) or a graphic user interface (GUI) associated with a speed, a direction, a distance indication, or the like. When the vehicle is in a black box mode or an image capture mode, the display may display a captured image, a UI, or a GUI.

The output device 130 may include at least one of a liquid crystal display (LCD), a thin film transistor-liquid crystal display (TFT LCD), an organic light-emitting diode (OLED) display, a flexible display, a three-dimensional (3D) display, or a dual display which displays another image depending on a viewing direction (e.g., a map may be displayed when seeing one display on the driver's seat and a broadcast screen may be displayed when seeing the one display on the passenger seat).

Some of these displays may be configured with a transparent type or a light transmissive type to see the outside through them. This may be referred to as a transparent display, and a representative example of the transparent display may be a transparent OLED (TOLED) display or the like. A rear structure of the display may also be configured with the light transmissive type.

The sound output module may output an acoustic signal (e.g., a warning sound, a notification sound, a route guidance voice, or the like) associated with a function performed by the multimedia system for vehicle. Such a sound output module may include a receiver, a speaker, a buzzer, or the like.

The controller 40 may perform the overall control such that respective components may normally perform their own functions. Such a controller 40 may be implemented in the form of hardware, may be implemented in the form of software, or may be implemented in the form of a combination thereof. The controller 40 may be implemented as, but not limited to, a computer, a processor, a microprocessor, an electronic control unit (ECU), or the like.

Particularly, the controller 40 may perform a variety of control in a process of inputting previous trajectory information of the target vehicle traveling around the host vehicle (the autonomous vehicle) and lane information around the target vehicle to a lane selection network (LSN), the learning of which is completed, to detect reference lane information and inputting the detected reference lane information and the previous trajectory information of the target vehicle to a trajectory prediction network (TPN), the learning of which is completed, to output future trajectory information of the target vehicle.

The controller 40 may extract lane information around the target vehicle from the high definition map stored in the storage 10. In this case, the controller 40 may obtain a high definition map around the target vehicle from an external server (not shown).

The controller 40 may detect previous trajectory information of the target vehicle based on various sensor data obtained by the sensor device 20. Such a technology of detecting the previous trajectory information of the target vehicle is well known and commonly used as described in the existing technology.

Hereinafter, the operation of the controller 40 will be described in detail with reference to FIGS. 3 and 6.

Figure 3:
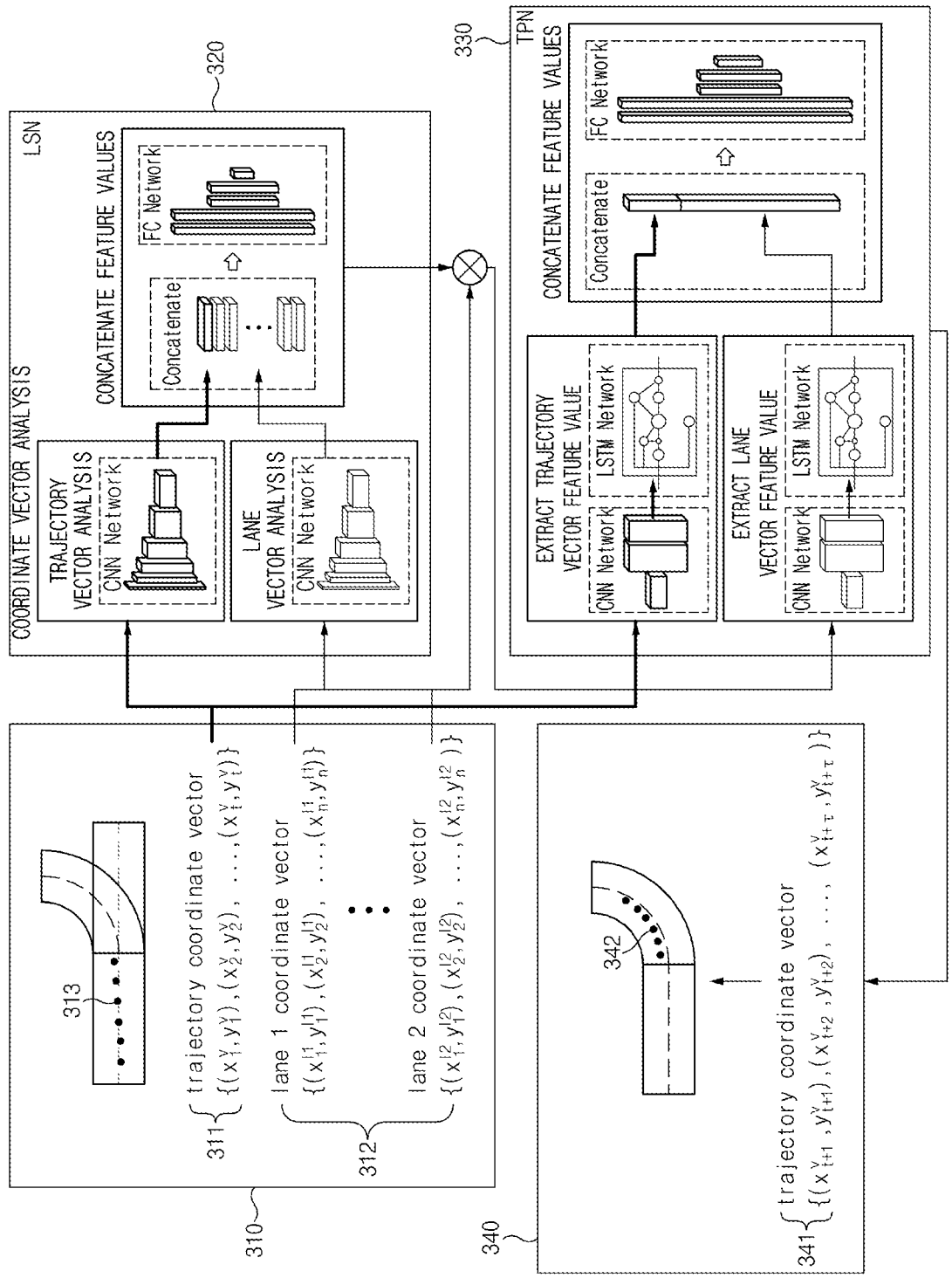
FIG. 3 is a drawing illustrating the overall operation of a controller provided in an apparatus for predicting a trajectory of a surrounding vehicle according to an embodiment of the present disclosure.

FIG. 3 is a drawing illustrating the overall operation of a controller provided in an apparatus for predicting a trajectory of a surrounding vehicle according to an embodiment of the present disclosure.

First of all, a controller 40 of FIG. 1 may extract previous trajectory information 311 of a target vehicle and lane information 312 around the target vehicle based on a high definition map stored in a storage 10 of FIG. 1 and various data obtained by means of a sensor device 20 of FIG. 1 (see reference numeral 310). In this case, the previous trajectory information 311 of the target vehicle may correspond to a plurality of points 313 as a TCV.

Thereafter, the controller 40 may input the previous trajectory information 311 of the target vehicle and the lane information 312 around the target vehicle to an LSN (e.g., a model), the learning of which is completed, to detect reference lane information (see reference numeral 320).

Thereafter, the controller 40 may input the detected reference lane information and the previous trajectory information 311 of the target vehicle to a TPN (e.g., a model), the learning of which is completed, to predict future trajectory information of the target vehicle (see reference numeral 330).

Thereafter, the controller 40 may display the predicted future trajectory information 341 of the target vehicle as a plurality of points 342 on a map.

Figure 4:
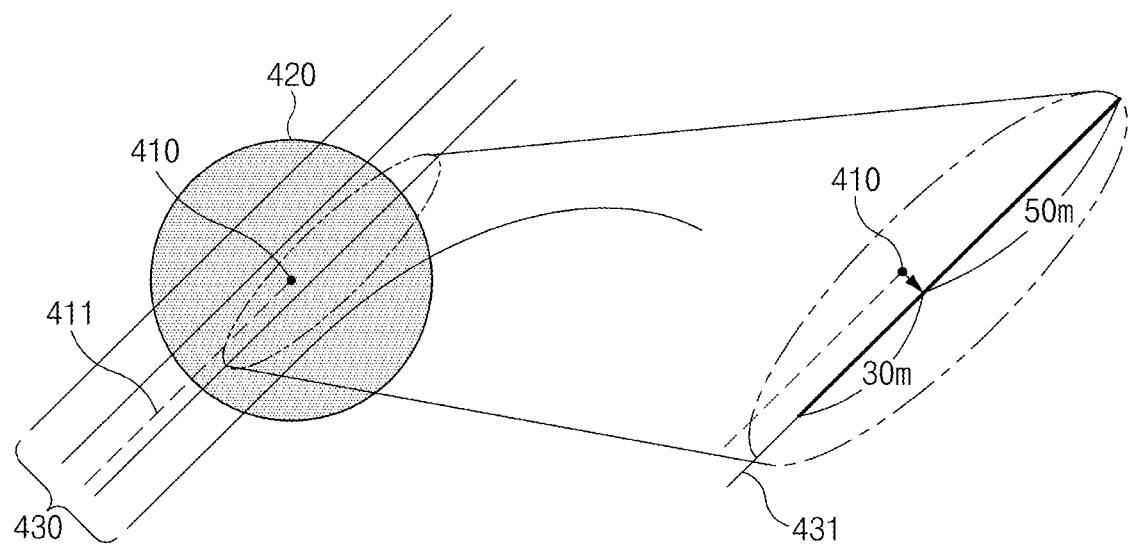
FIG. 4 is a drawing illustrating a process of extracting lane information around a target vehicle in a controller provided in an apparatus for predicting a trajectory of a surrounding vehicle according to an embodiment of the present disclosure.

FIG. 4 is a drawing illustrating a process of extracting lane information around a target vehicle in a controller provided in an apparatus for predicting a trajectory of a surrounding vehicle according to an embodiment of the present disclosure.

In FIG. 4, reference numeral '410' indicates a current location of the target vehicle, a dotted line 411 indicates previous trajectory information of the target vehicle, reference numeral '420' indicates an area (e.g., 20 m) around the target vehicle, and reference numeral '430' refers to center lines for lands around the target vehicle.

The controller 40 of FIG. 1 may determine center lines for surrounding lanes with respect to a center line 431 located closest to a previous driving trajectory of the target vehicle. In this case, the controller 40 may refer to a high definition map.

The controller 40 may project the current location 410 of the target vehicle onto the center line 431, may set a segment (e.g., 50 m in front of the target vehicle or 30 m behind the target vehicle) with respect to the current location 410 of the target vehicle on the center line 431, and may extract coordinates of equal intervals on the segment as lane information. The controller 40 may extract a plurality of lane information from each center line in such a manner. Each of the plurality of extracted lane information may be labeled to be input to a TPN.

Figure 5:
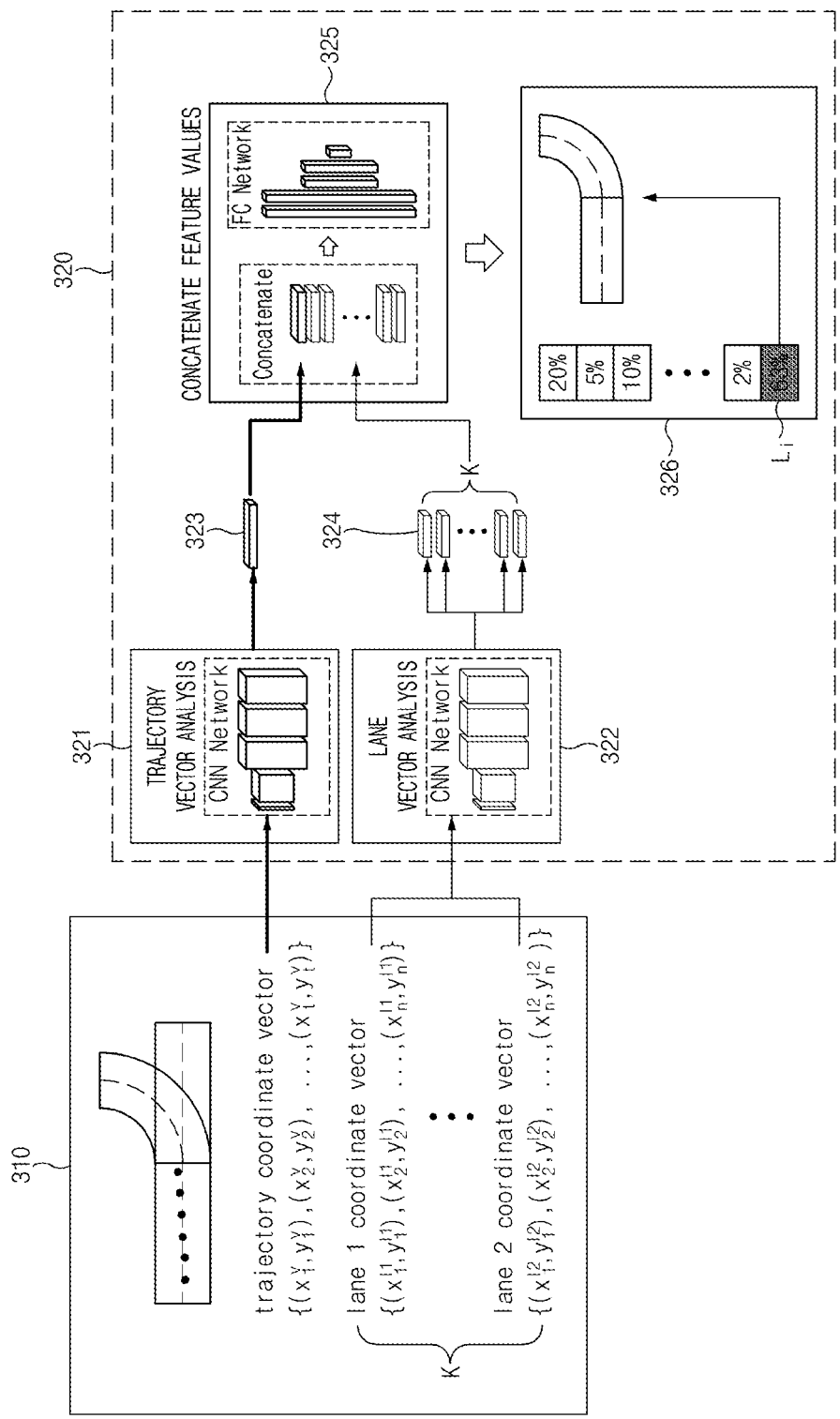
FIG. 5 is a drawing illustrating a process of detecting reference lane information of a target vehicle in a controller provided in an apparatus for predicting a trajectory of a surrounding vehicle according to an embodiment of the present disclosure.

FIG. 5 is a drawing illustrating a process of detecting reference lane information of a target vehicle in a controller provided in an apparatus for predicting a trajectory of a surrounding vehicle according to an embodiment of the present disclosure.

First of all, a lane selection network (LSN) may include a plurality of convolution neural networks (CNNs), a fully connected network (FCN), and a 'softmax function'.

Thereafter, in a path vector analysis process, the controller 40 may input previous trajectory information 311 of the target vehicle to a first CNN 321 to extract a first feature value 323. In this case, the first feature value 323 may refer to a vector of a certain magnitude corresponding to the input information.

In a lane vector analysis process, the controller 40 may input lane information 312 around the target vehicle to a second CNN 322 to extract K second feature values 324. In this case, the second feature value 324 may refer to a value corresponding to a degree to which each lane is selected.

In generally, a long short-term memory (LSTM) is applied to the LSN to process the trajectory information 311 and the lane information 312. However, in an embodiment of the present disclosure, the controller 40 may apply the first CNN 321 and the second CNN 322 to reduce a calculation load generated in a process of separately processing the trajectory information 311 and the lane information 312. The first CNN 321 and the second CNN 322 may play a preprocessing role by means of 'trial and error'.

Thereafter, the controller 40 may concatenate the first feature value 323 with the second feature values 324 to input the concatenated value to the FCN (see reference numeral 325).

Thereafter, the controller 40 may apply the 'softmax function' to the output of the FCN to calculate a probability value for each lane and may output lane information having the highest probability value as reference lane information (see reference numeral 326). In this case, a probability value of each lane indicates a probability that the target vehicle will select the lane.

Figure 6:
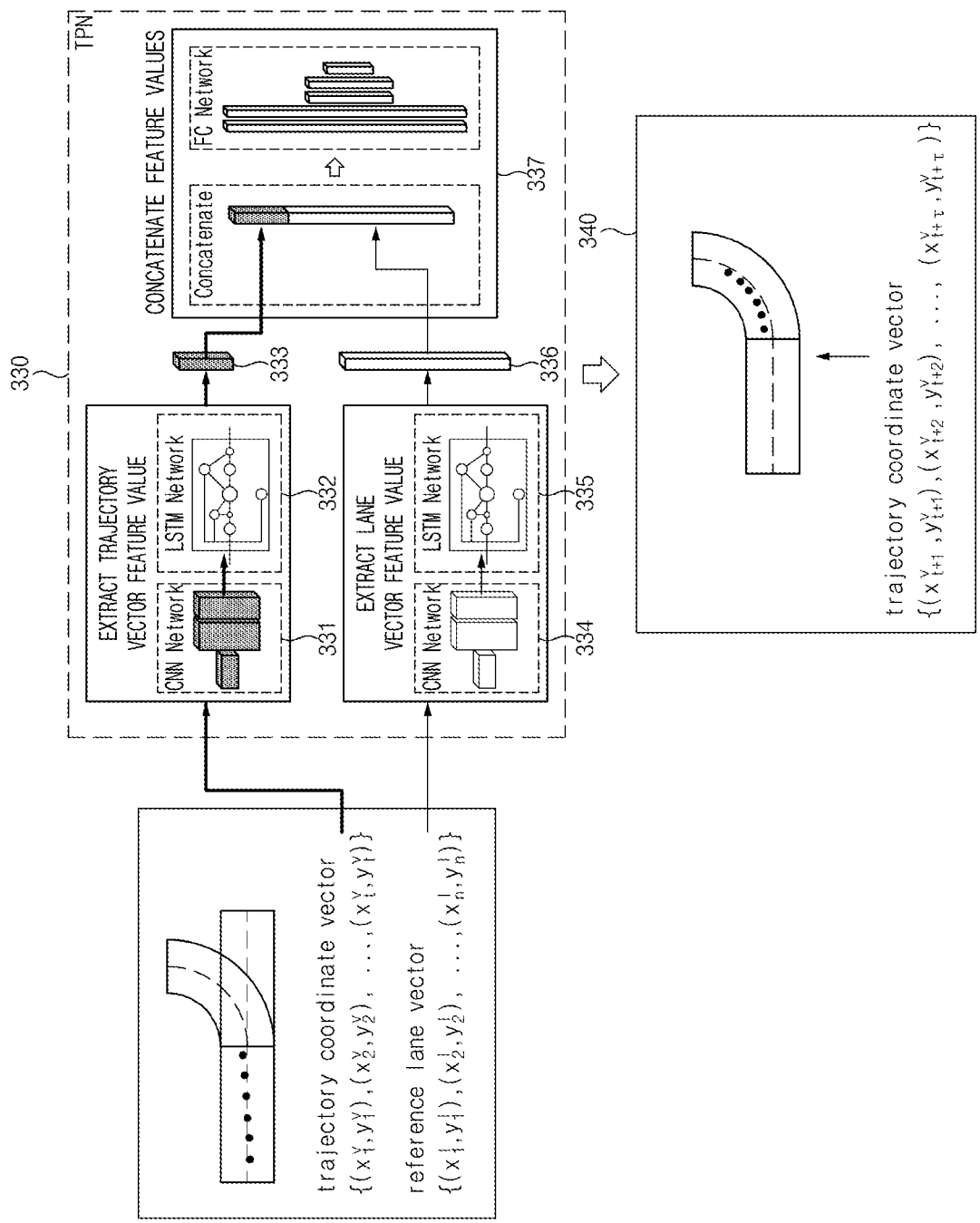
FIG. 6 is a drawing illustrating a process of predicting future trajectory information of a target vehicle in a controller provided in an apparatus for predicting a trajectory of a surrounding vehicle according to an embodiment of the present disclosure.

FIG. 6 is a drawing illustrating a process of predicting future trajectory information of a target vehicle in a controller provided in an apparatus for predicting a trajectory of a surrounding vehicle according to an embodiment of the present disclosure.

First of all, a trajectory coordinate network (TPN) may include a third CNN 331, a first LSTM network 332, a fourth CNN 334, a second LSTM network 335, and an FCN to analyze consecutive time series data (e.g., coordinates). Such a TPN may predict a movement trajectory of a target vehicle in real time by means of a connection structure between the CNN and the LTSM network and may efficiently extract a feature value in the process of predicting the movement trajectory of the target vehicle in real time.

Thereafter, in a trajectory vector feature value extraction process, the controller 40 may input previous trajectory information 311 of the target vehicle to the third CNN 331 and may input the output of the third CNN 331 to the first LSTM network 332 to extract a feature value 333 for the previous trajectory information of the target vehicle.

In a lane vector feature value extraction process, the controller 40 may input reference lane information of the target vehicle to the fourth CNN 334 and may input the output of the fourth CNN 334 to the second LSTM network 335 to extract a feature value 336 for the reference lane information of the target vehicle.

Thereafter, the controller 40 may concatenate the feature value 333 for the previous trajectory information of the target vehicle with the feature values 336 for the reference lane information to input the concatenated value to the FCN (see reference numeral 337).

Thereafter, the controller 40 may predict future trajectory information of the target vehicle based on an output of the FCN. In this case, the future trajectory may be, for example, a trajectory for 3 seconds in the future.

Figure 7:
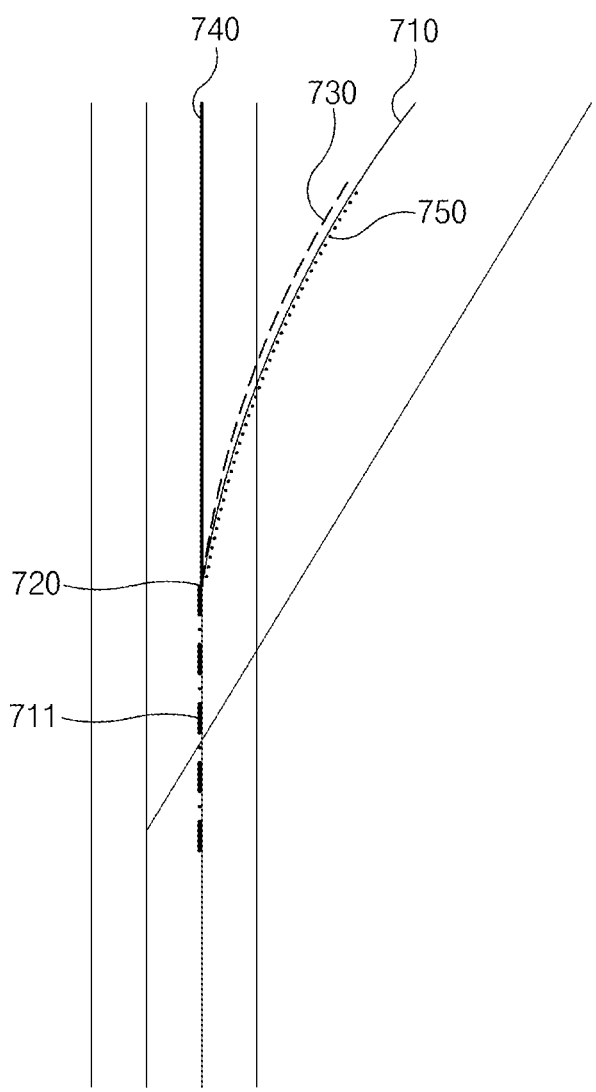
FIG. 7 is a drawing illustrating an analysis of performance of an apparatus for predicting a trajectory of a surrounding vehicle according to an embodiment of the present disclosure.

FIG. 7 is a drawing illustrating an analysis of performance of an apparatus for predicting a trajectory of a surrounding vehicle according to an embodiment of the present disclosure.

In FIG. 7, reference numeral '710' indicates a reference lane, reference numeral '711' indicates a previous trajectory of the target vehicle, reference numeral '720' indicate a current location of the target vehicle, reference numeral '730' indicate a trajectory where the target vehicle travels actually, reference numeral '740' indicates a future trajectory of the target vehicle, which is predicted in an existing scheme, and reference numeral '750' indicates a future trajectory of the target vehicle, which is predicted in a scheme according to an embodiment of the present disclosure.

As shown in FIG. 7, it may be seen that the future trajectory 740 of the target vehicle, which is predicted in the existing scheme according to the related art, differs from the trajectory 730 where the target vehicle travels actually, whereas the future trajectory 750 of the target vehicle, which is predicted in the scheme according to an embodiment of the present disclosure, is the same as the trajectory 730 where the target vehicle travels actually.

Figure 8:
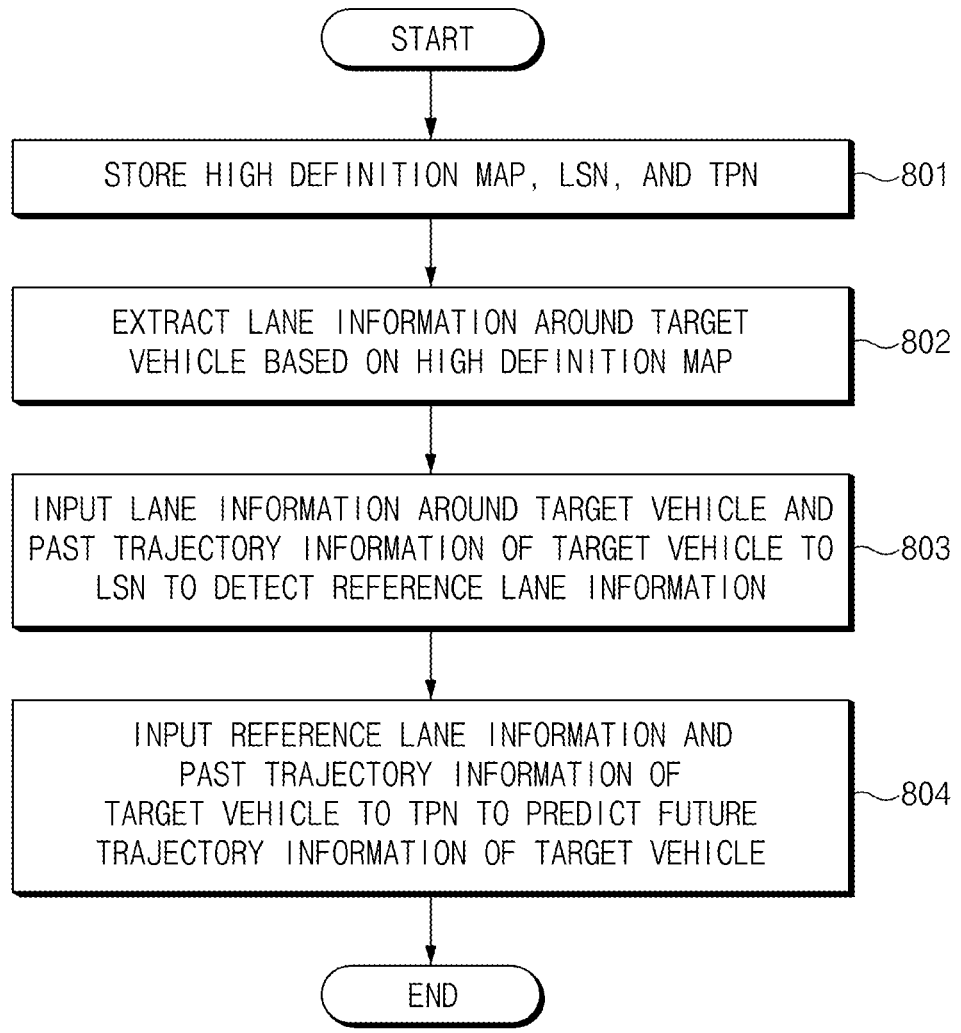
FIG. 8 is a flowchart illustrating a method for predicting a trajectory of a surrounding vehicle according to an embodiment of the present disclosure.

FIG. 8 is a flowchart illustrating a method for predicting a trajectory of a surrounding vehicle according to an embodiment of the present disclosure.

Once the process of for predicting a trajectory of a surrounding vehicle starts, in operation 801, the storage 10 of FIG. 1 may store a high definition map, a lane selection network (LSN), and a trajectory prediction network (TPN).

In operation 802, the controller 40 of FIG. 1 may detect and extract lane information around a target vehicle based on the high definition map.

In operation 803, the controller 40 may input the lane information around the target vehicle and previous trajectory information of the target vehicle to the LSN to detect reference lane information.

In operation 804, the controller 40 may input the reference lane information and the previous trajectory information of the target vehicle to the TPN to predict future trajectory information of the target vehicle.

Figure 9:
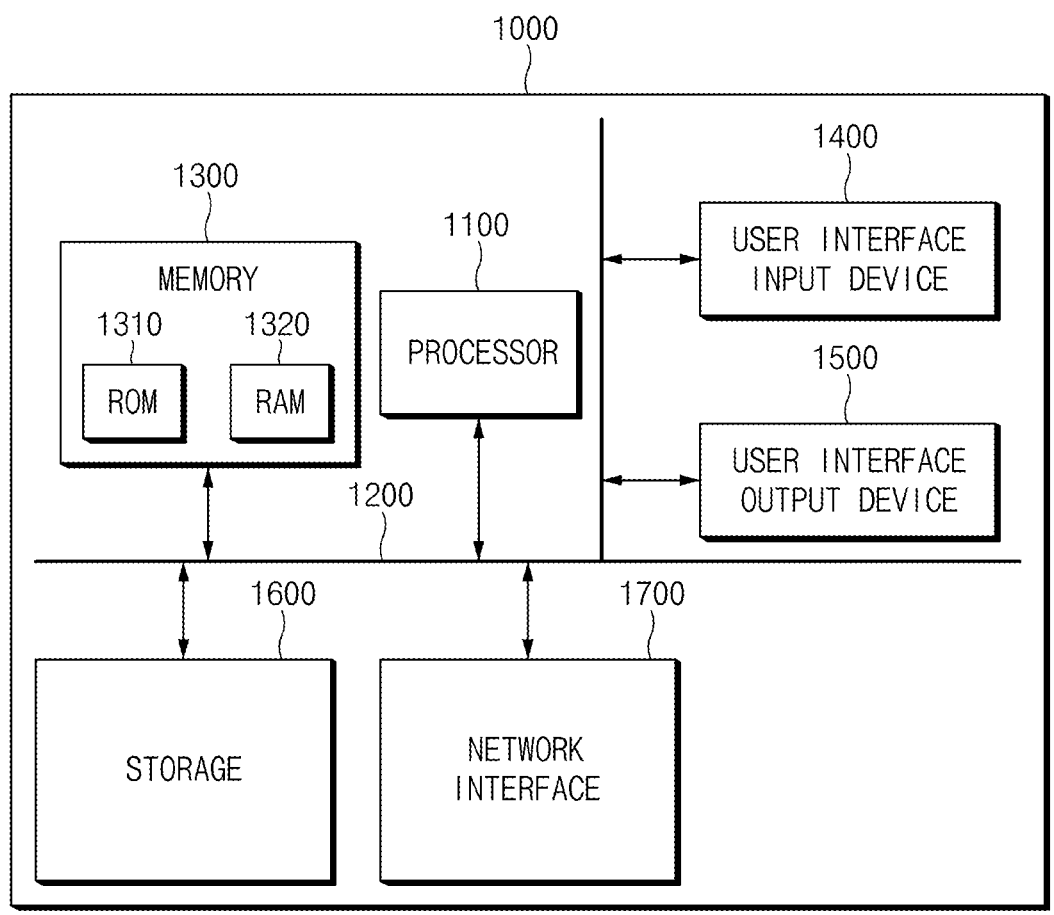
FIG. 9 is a block diagram illustrating a computing system for executing a method for predicting a trajectory of a surrounding vehicle according to an embodiment of the present disclosure.

FIG. 9 is a block diagram illustrating a computing system for executing a method for predicting a trajectory of a surrounding vehicle according to an embodiment of the present disclosure.

Referring to FIG. 9, the above-mentioned method for predicting the trajectory of the surrounding vehicle according to an embodiment of the present disclosure may be implemented by means of the computing system. A computing system 1000 may include at least one processor 1100, a memory 1300, a user interface input device 1400, a user interface output device 1500, storage 1600, or a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus and the method for predicting the trajectory of the surrounding vehicle according to an embodiment of the present disclosure may be provided to input previous trajectory information of the target vehicle and lane information around the target vehicle to a lane selection network (LSN), the learning of which is completed, to detect reference lane information and input the detected reference lane information and the previous trajectory information of the target vehicle to a trajectory prediction network (TPN), the learning of which is completed, to output future trajectory information of the target vehicle to predict a future trajectory of the target vehicle at high accuracy.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for predicting a trajectory of a surrounding vehicle, the apparatus comprising:
a storage configured to store a high definition map, a Lane Selection Network (LSN) including at least one Convolution Neural Network (CNN), and a Trajectory Prediction Network (TPN); and
a controller configured to:
extract lane information around a target vehicle, traveling around a host vehicle, based on the high definition map,
input the lane information around the target vehicle and previous trajectory information of the target vehicle to the LSN to detect reference lane information, and
input the reference lane information and the previous trajectory information of the target vehicle to the TPN to acquire future trajectory information of the target vehicle,
wherein the lane information includes a Lane Coordinate Vector (LCV) indicating a center line of each lane, and
wherein the controller determines center lines for respective lanes based on a reference center line located closest to a previous driving trajectory of the target vehicle, projects a current location of the target vehicle onto each center line, sets segments with respect to the current location of the target vehicle on each center line, and extracts coordinates of equal intervals on each segment as the lane information.

2. The apparatus of claim 1, wherein the controller is further configured to control a display to output the future trajectory information of the target vehicle on a map.

3. The apparatus of claim 1, wherein the previous trajectory information and the future trajectory information of the target vehicle are a Trajectory Coordinate Vector (TCV).

4. The apparatus of claim 1, wherein the controller inputs the previous trajectory information of the target vehicle to a first Convolution Neural Network (CNN) to extract a first feature value, inputs the lane information around the target vehicle to a second CNN to extract a second feature value, concatenates the first feature value with the second feature value to input the concatenated value to a Fully Connected Network (FCN), applies softmax function to a first output of the FCN to calculate a probability value for each lane, and outputs lane information having a highest probability value as the reference lane information.

5. The apparatus of claim 1, wherein the controller inputs the previous trajectory information of the target vehicle to a third CNN, inputs an output of the third CNN to a first Long Short-Term Memory (LSTM) network to extract a third feature value for the previous trajectory information of the target vehicle, inputs the reference lane information of the target vehicle to a fourth CNN, inputs an output of the fourth CNN to a second LSTM network to extract a fourth feature value for the reference lane information of the target vehicle, concatenates the third feature value with the fourth feature value to input a concatenated value of the third and fourth feature values to an FCN, and outputs a second output of the FCN as the future trajectory information of the target vehicle.

6. The apparatus of claim 1, wherein the controller obtains the high definition map around the target vehicle from a server and stores the obtained high definition map in the storage.

7. A method for predicting a trajectory of a surrounding vehicle, the method comprising:
storing, by a storage, a high definition map, a Lane Selection Network (LSN) with including at least one Convolution Neural Network (CNN), and a Trajectory Prediction Network (TPN);
extracting, by a controller, lane information around a target vehicle, traveling around a host vehicle, based on the high definition map;
inputting, by the controller, the lane information around the target vehicle and previous trajectory information of the target vehicle to the LSN to obtain reference lane information; and
inputting, by the controller, the reference lane information and the previous trajectory information of the target vehicle to the TPN to acquire future trajectory information of the target vehicle,
wherein the lane information is a Lane Coordinate Vector (LCV) indicating a center line of each lane, and
wherein the extracting of the lane information around the target vehicle includes:
determining center lines for respective lanes based on a reference center line located closest to a previous driving trajectory of the target vehicle;
projecting a current location of the target vehicle onto each center line;
setting segments with respect to the current location of the target vehicle on each center line; and
extracting coordinates of equal intervals on each segment as the lane information.

8. The method of claim 7, further comprising displaying on a display, which is controlled by the controller, the future trajectory information of the target vehicle on a map.

9. The method of claim 7, wherein the previous trajectory information and the future trajectory information of the target vehicle are a Trajectory Coordinate Vector (TCV).

10. The method of claim 7, wherein the inputting of the lane information and previous trajectory information to obtain the reference lane information includes:
inputting the previous trajectory information of the target vehicle to a first Convolution Neural Network (CNN) to extract a first feature value;
inputting the lane information around the target vehicle to a second CNN to extract a second feature value;
concatenating the first feature value with the second feature value to input the concatenated value to a Fully Connected Network (FCN);
applying softmax function to a first output of the FCN to calculate a probability value for each lane; and
outputting lane information having a highest probability value as the reference lane information.

11. The method of claim 7, wherein the inputting the reference lane information and the previous trajectory information to acquire the future trajectory information includes:
inputting the previous trajectory information of the target vehicle to a third CNN;

inputting an output of the third CNN to a first Long Short-Term Memory (LSTM) network to extract a third feature value for the previous trajectory information of the target vehicle;
inputting the reference lane information of the target vehicle to a fourth CNN;
inputting an output of the fourth CNN to a second LSTM network to extract a fourth feature value for the reference lane information of the target vehicle;
concatenating the third feature value with the fourth feature value to input the concatenated value to an FCN; and
outputting a second output of the FCN as the future trajectory information of the target vehicle.

12. The method of claim 7, wherein the storing includes obtaining, by the controller, the high definition map around the target vehicle from a server.

* * * * *